May 12, 1959  E. C. SIMMONDS  2,885,996
BUTTER SPREADING MACHINES

Filed Jan. 17, 1957  4 Sheets—Sheet 4

INVENTOR
Edwin C. Simmonds
BY
Alexander Dowell
ATTORNEYS

United States Patent Office 2,885,996
Patented May 12, 1959

2,885,996
BUTTER SPREADING MACHINES

Edwin Charles Simmonds, Oldham, England, assignor to B.A.M. Patentees Limited, Oldham, Lancashire, England Application January 17, 1957, Serial No. 634,763

Claims priority, application Great Britain January 24, 1956

5 Claims. (Cl. 118—18)

This invention relates to spreading machines for the spreading of any required viscous substance upon any required more or less solid base and especially for the spreading of butter and margarine upon slices of bread. The term "butter" used hereinafter is intended to include other similar substances and the term "bread" is intended to include other similar bases.

The main object of the present invention is to provide improvements in the spreading machine described in the specification of U.S. Letters Patent No. 2,851,003, issued September 9, 1958, and in British Patent No. 740,914, my invention comprising a foraminous rotary cylindrical carrier, means for filling the perforations in the carrier with said substance, and a series of projections carried by a roller and meshing with said perforations for ejecting the substance therefrom on to the surface of the base. The carrier is in the form of a cylinder and the base is carried past the carrier by a conveyor such as an endless belt.

According to the present invention a spreading machine is provided which comprises a foraminous rotary carrier, means for filling the perforations in the carrier with said substance, a series of projections carried by a roller and meshing with said perforations for ejecting the substance therefrom on to the surface of the base, and means whereby the conveyor is driven in the same direction as the adjacent part of the carrier but at a lower speed so as to achieve a spreading effect on the base.

A constructional form of the invention will now be described by way of example with reference to the accompanying drawings wherein.

Figure 1:
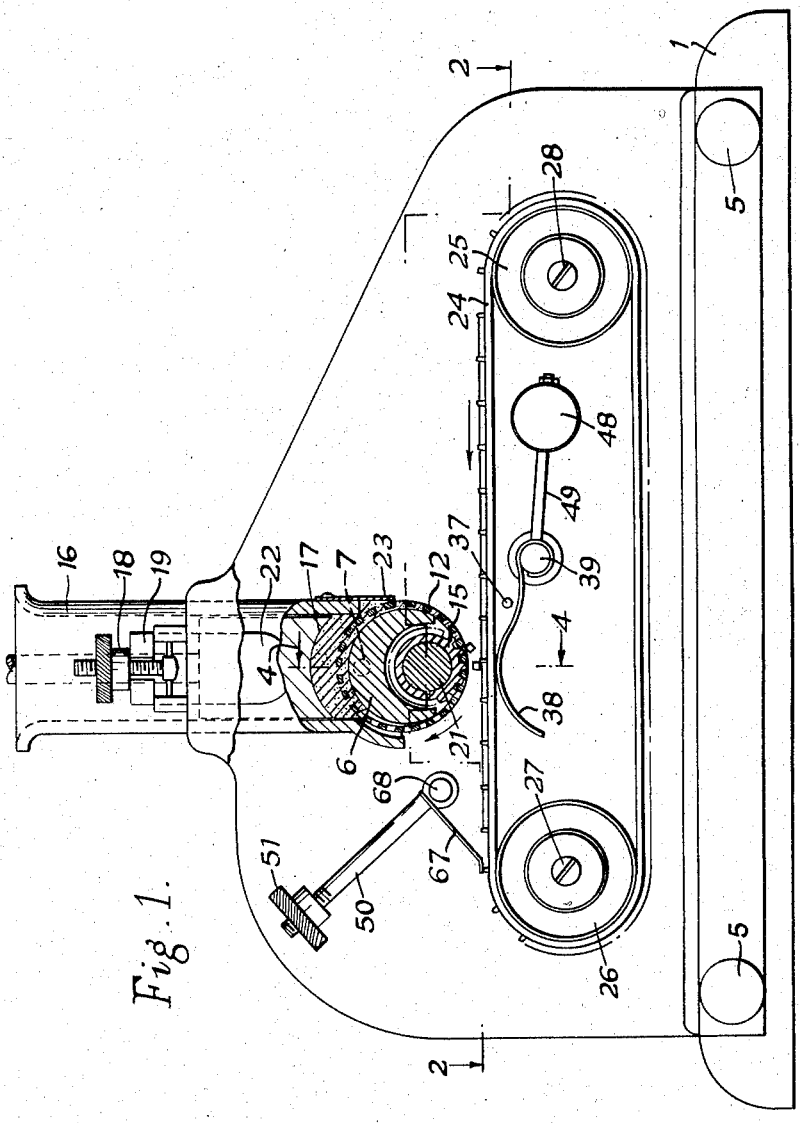
Figure 1 is a side elevation with the base frame and electric motor omitted.
Figure 2:
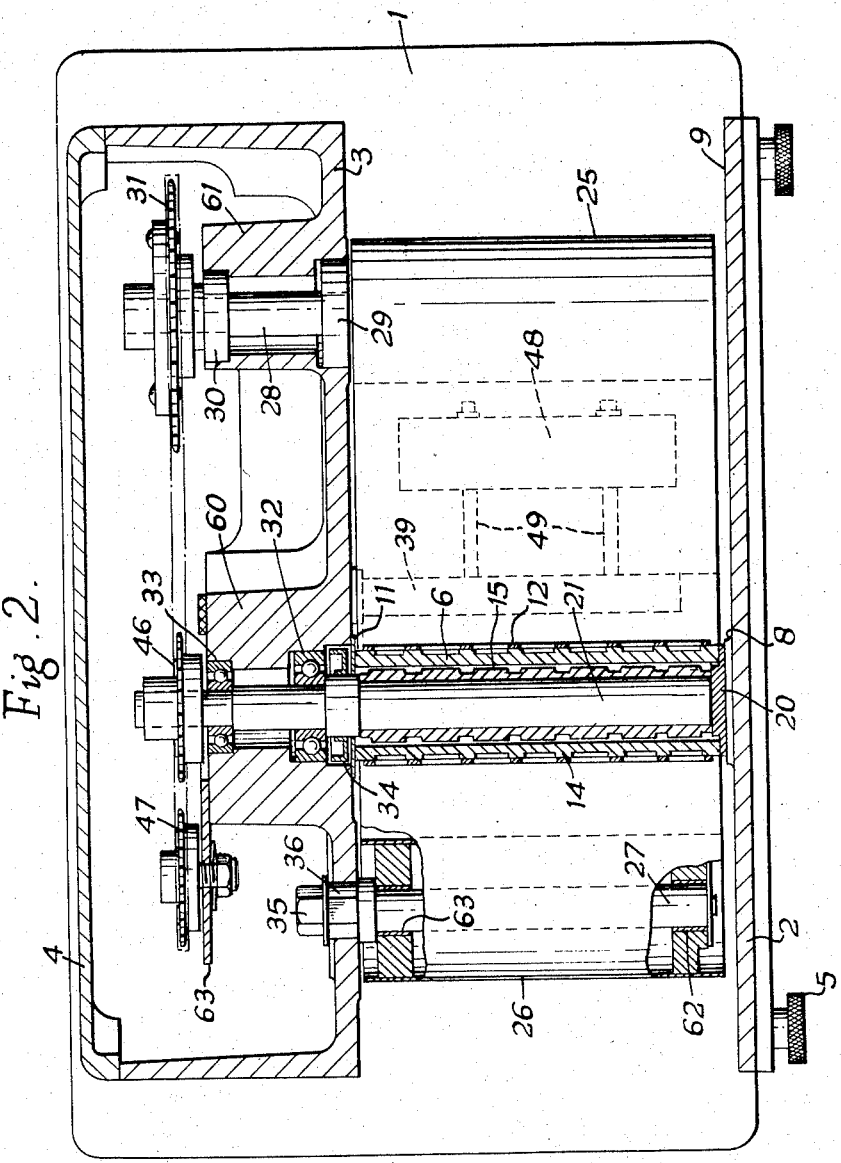
Figure 2 is a sectional view taken along the line 2—2 in Figure 1.

A machine for butter spreading comprises a base 1 supporting a side plate 2 on one side of said base and a pair of side plates 3, 4, on the other side parallel with each other and with the plate 2. The side plates 3, 4 are bolted to the base and the plate 2 is secured to the base by two thumb screws 5.

The side plate 2 is provided with a boss 8 facing inwardly, which is machined parallel with the plate 2. An arcuate block 6 is firmly held longitudinally between the plates 2 and 3 and at right angles thereto. The end of the block which is near plate 2 is held against a circular sealing plate 20 which is provided with a circular bore in a boss the axis of which is positioned eccentrically and vertically below the centre of the said plate. This plate 20 is rigidly supported by a pin which passes through the side plate 2 and the plate 20 and into the end of the block. The plate 20 is also supported by a spindle 21 which passes through the eccentric boss and which is in turn supported by side plate 3 by means of bearings 32 and 33 mounted in a boss 60.

The end of the arcuate block which is near the plate 3 is held against another circular plate 11 which has a bore, and fits closely around the spindle 21. The plate 11 and also the arcuate block, are held in this position by pins 10 passing into the side plate 3.

The arcuate block 6 has a crescent-shaped cross-section and the outer surface provides a bearing for a foraminated cylindrical carrier 12. The outer surface of the block 6 has an equal radius to that of the inside of the carrier.

Grooves are provided around the outer surface of the arcuate block 6 which are machined to a depth of about one sixteenth of an inch, said grooves being so positioned as to lie opposite the rows of perforations provided in the carrier 12. Each groove is machined to run out flush with the block surface at the lower edges of said block. The lands between the grooves engage the carrier 12 between the rows of perforations upon which lands the carrier rotates.

The spindle 21 supports a toothed roller 15 accurately meshed with the perforations in the carrier 12 and also serves to rotate the carrier.

The spindle 21 is mounted in ball bearings 32, 33 carried in the boss 60 and an oil seal is interposed between the plate 11 and the bearing 32. The outer end of the spindle projects beyond the boss 60 and supports a drive sprocket firmly keyed to the spindle.

The arcuate block 6 is approximately three sixteenths of an inch longer than the carrier 12 at each end and the block acts as a direct support for a hopper 16, said hopper 16 being machined to the same radius as that of the outside surface of the block 6 so that it seats accurately on said block. The hopper is secured in this position by adjustable screws 18 attached to the side plates 2, 3, engaging with forked brackets 19 attached to the side of the hopper.

The leading edge of the hopper 16 is provided with an arcuate form which has a radius greater than that of the carrier 12, said arcuate form fitting round the carrier but permitting a clearance of about one eighth of an inch therefrom. The trailing edge is provided with an adjustable plate 23 whose lower edge can be brought in close proximity with the carrier 12.

A conveyor belt 24 is supported on rollers 25, 26 and is arranged in a horizontal position so that the carrier 12 is over the central portion of the conveyor 24. The roller 26 is mounted on the spindle 27 by means of bush bearings 62, 63 and the spindle 27 is adjustably mounted at one end in a slot in the plate 3, a nut 35 being used for locking the spindle in position. This adjustment is for the tensioning of the conveyor belt 24.

The roller 25 is carried by spindle 28 which is mounted at one end in two bearings 29, 30 which are carried in a boss 61 formed on the plate 3. The end of the spindle extends through this boss and carries a sprocket 31.

Both the sprockets 46 and 31 may be replaced if desired by other sprockets having a required number of teeth. These sprockets are arranged so that the roller 25 and carrier 12 rotate in the same direction.

Figure 3:
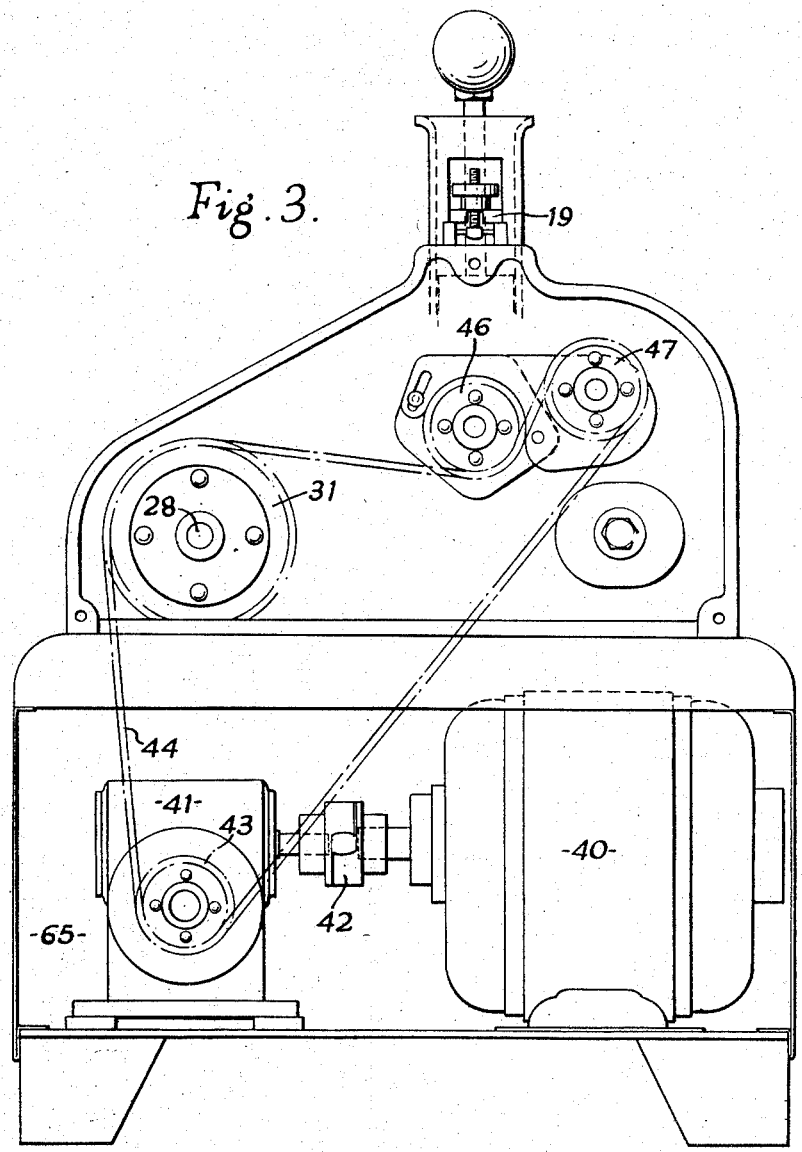
Figure 3 is an elevational view from the rear of the machine showing the drive mechanism including an electric motor, coupling and reduction gear.
Figure 4:
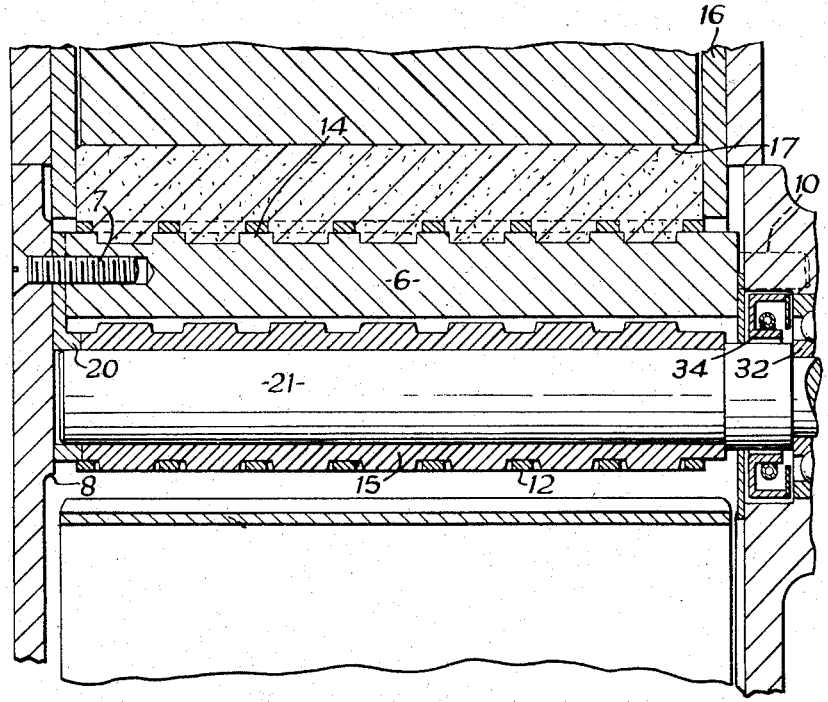
Figure 4 is a vertical section on the line 4—4 of Figure 1.

It will be seen in Figure 3 that the roller 25 and carrier 12 are driven by a chain 44 from a sprocket 43. A motor 40 is housed within the base frame 65 and is drivably connected to a reduction gear 41 by a coupling 42, the output shaft of said reduction gear carrying a sprocket 43. The tension in the chain 44 is adjustable by means of a jockey sprocket 47 which is carried on a plate 63 which in turn is mounted on the outer face of the boss 60. The space between the upper surface of the conveyor belt 24 and carrier 12 is adjusted according to the thickness of the bread, by means of a curved plate 38 mounted on a spindle 39 which is positioned below the upper surface of the conveyor belt. The tension on the belt produced by the curved plate is maintained by a counter balance 48 carried on rods 49 rigidly attached to the spindle 39.

The spreader plate 67 mounted on the rod 68 is positioned above the roller 26 and is kept in tension against the conveyor belt by means of an adjustable weight 51 carried on a rod 50 which is pivotally mounted on the spindle 68.

The sprocket 31 is selected to have a greater number of teeth than the sprocket 46 in order that the peripheral speed of the rotation of the carrier 12 may be one and one third times to twice the speed of the conveyor belt 24. The purpose of this will be later explained.

The operation of the machine is as follows: Butter is placed into the hopper 16, and the weight 22 adjusted. The butter is forced through the perforations in the carrier 12 as the carrier rotates, the grooves in the arcuate block 6 facilitating the entry of the butter into the perforations. As the carrier 12 rotates the pats formed by the perforations are pushed therefrom by means of the teeth provided on the roller 15. The bread which is passing beneath the carrier 12 in the same direction as that part of the carrier 12 which is in close proximity to it, is spread with butter pats from each line of perforations in turn and due to the difference in speed the butter is spread over the bread. The bread continues along the conveyor below and the spreading of the butter is completed by the spreader plate 67. The thickness of the bread is inconsequential due to the curved plate 38 pushing the bread against the carrier 12. Should there be no bread passing beneath the carrier 12 the conveyor is prevented from being pushed against the carrier 12 by means of the stop 37 which engages the curved plate 38. Butter is thereby not undesirably spread on the conveyor belt.

Butter is prevented from escaping from the carrier 12 except through the perforations by means of the plates 20 and 11 and also by means of the adjustable plate 23. The seal 34 prevents escapement of butter and also prevents ingress of oil from the bearings 32 and 33. By reason of the plate 23 and the running out of the grooves at the lower edges of the block 6, the butter pats are formed with a thickness equal to that of the wall of the carrier 12.

The result of moving the bread on the conveyor in the same direction as the butter pat being ejected from the carrier is that no deposition of butter occurs on the leading edge of each portion of bread as it moves beneath the carrier.

The result of the increased radius of the bottom curvature of the hopper at the leading edge in proximity to the carrier 12 and the clearance resulting therefrom, is to allow butter which may adhere to the outer surface of the rotating carrier to be returned to the hopper 16, thus preventing butter being wasted and maintaining proper control of the spreading.

I claim:

1. In a spreading machine for spreading a viscous substance on a surface of base elements, having a foraminous rotary carrier and having means on one side of said carrier for filling the perforations in the carrier with said substance, and a roller having a series of projections carried thereby, said projections meshing with said perforations for ejecting the substance therefrom onto the surface of the base elements, and having a conveyor located on the opposite side of the carrier from said filling means and spaced from the carrier to receive the base elements between the conveyor and the carrier; the improvement comprising means driving the conveyor in the same direction as the adjacent part of the carrier but at a lower speed, whereby a spreading effect is achieved on said surface while leaving the leading edges of said elements free of said viscous substance, to achieve a spreading effect on the base elements.

2. In a spreading machine as set forth in claim 1, the speed of the carrier adjacent the conveyor being from one-and-one-third to two-times the speed of the conveyor.

3. In a spreading machine for spreading a viscous substance on a surface of base elements, having a foraminous rotary carrier and having means on one side of said carrier for filling the perforations in the carrier with said substance, and a roller having a series of projections carried thereby, said projections meshing with said perforations for ejecting the substance therefrom on to the surface of the base elements, and having a movably mounted resilient endless belt conveyor located on the opposite side of the carrier from said filling means and spaced from the carrier to receive the base elements between the conveyor and the carrier; the improvements comprising means driving the conveyor in the same direction as the adjacent part of the carrier but at a lower speed, whereby a spreading effect is achieved on said surface while leaving the leading edges of said elements free of said viscous substance, to achieve a spreading effect on the base elements, and a presser member engaging the belt adjacent the carrier, to effect instantaneous automatic adjustment of the belt according to the thickness of the base by flexing the belt and thereby pressing the base on the carrier and continuously urging it towards the carrier; and stop means to limit the movement of the belt towards the carrier.

4. In a spreading machine for spreading a viscous substance on a surface of base elements, having a foraminous rotary carrier and having means on one side of said carrier for filling the perforations in the carrier with said substance, and having a bearing block supporting the carrier by engagement with parts of the inner surface of the carrier, said carrier being rotatable in relation to the bearing block, and having a roller having a series of projections carried thereby, said projections meshing with said perforations for ejecting the substance therefrom onto the surface of the base elements, and having a conveyor located on the opposite side of the carrier from said filling means and spaced from the carrier to receive the base elements between the conveyor and the carrier; the improvements comprising means driving the conveyor in the same direction as the adjacent part of the carrier but at a lower speed, whereby a spreading effect is achieved on said surface while leaving the leading edges of said elements free of said viscous substance, to achieve a spreading effect on the base elements, and grooves on said bearing block forming annular ribs which engage the inner surface of the carrier which has said perforations between the ribs.

5. In a spreading machine as set forth in claim 1, said projections being formed on a hollow roller eccentrically located within the carrier which is carried by a bearing block located within the carrier; and a first plate engaging one end of the bearing block and having an eccentric boss thereon which closes the adjacent end of the roller, the other end of the roller being closed by a second plate which surrounds a spindle on which the roller is fixed, said spindle projecting from said other end and being mounted on spaced bearings separated by an oil seal from said second plate.

References Cited in the file of this patent

UNITED STATES PATENTS

| | | |
|---|---|---|
| 1,818,911 | Savy | Aug. 11, 1931 |
| 1,909,482 | Barrett | May 16, 1933 |
| 1,966,980 | Hickley | July 17, 1934 |
| 2,510,658 | Rassman | June 6, 1950 |
| 2,851,003 | Binsted et al. | Sept. 9, 1958 |

FOREIGN PATENTS

| | | |
|---|---|---|
| 740,914 | Great Britain | Nov. 23, 1955 |